United States Patent Office 3,836,519
Patented Sept. 17, 1974

3,836,519
SULFONYL DERIVATIVES OF ERYTHROMYCIN
Robert Hallas and Jerry Roy Martin, Waukegan, and John Soloman Tadanier, Chicago, Ill., assignors to Abbott Laboratories, Chicago, Ill.
No Drawing. Filed May 4, 1973, Ser. No. 357,121
Int. Cl. C07c *129/18*
U.S. Cl. 260—210 E                    7 Claims

ABSTRACT OF THE DISCLOSURE

Covers sulfonyl derivatives of erythromycin A, B and C falling within the following structural formula:

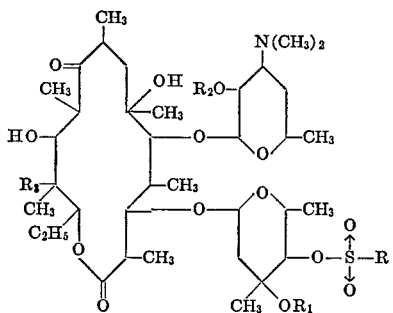

where R is selected from the group consisting of loweralkyl, loweralkenyl, aryl, substituted aryl, benzyl, substituted benzyl, aroxyalkyl, and substituted aroxyalkyl; $R_1$ is hydrogen or methyl; $R_2$ is hydrogen or loweralkanoyl and $R_3$ is hydrogen or hydroxyl said erythromycin derivatives being useful for their antibiotic activity.

DESCRIPTION OF THE INVENTION

This invention relates to derivatives of erythromycin A, B and C, and more particularly to 4″-O-sulfonyl derivatives of erythromycin A, B and C or 2′-O-alkanoyl-4″-O-sulfonyl derivatives of erythromycin A, B and C. The new and novel compounds of this invention have the following structural formula:

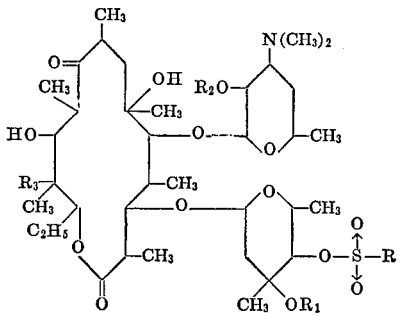

where R is selected from the group consisting of loweralkyl, loweralkenyl, aryl, substituted aryl, benzyl, substituted benzyl, aroxyalkyl and substituted aroxyalkyl; $R_1$ is hydrogen or methyl; $R_2$ is hydrogen or loweralkanoyl and $R_3$ is hydrogen or hydroxyl.

Erythromycin is produced in three forms denoted A, B and C by cultivating a strain of *Streptomyces erythreus* in a suitable nutrient medium as is taught in U.S. 2,653,899, Bunch et al. The structure of erythromycin is represented by the following formula:

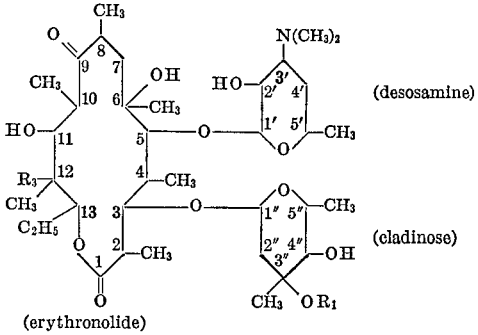

In this formula, when $R_1$ is methyl and $R_3$ is hydroxyl, the structure illustrated is erythromycin A. When $R_1$ is methyl and $R_3$ is hydrogen, the structure of erythromycin B is illustrated. When $R_1$ is hydrogen and $R_3$ is hydroxyl, the structure of erythromycin C is illustrated. The term "erythromycin" when used herein without modification is meant to embrace all three forms; that is, erythromycin A, B and C.

Erythromycin, as will be noted from the formula, comprises three cyclic fragments. These fragments are referred to respectively as cladinose, desosamine and erythronolide. The positions on the cladinose ring are indicated by double primed numbers; the positions on the desosamine ring by single primed numbers; while positions on the erythronolide ring are indicated by unprimed numbers.

The starting materials in preparing the compounds of the invention may be erythromycin or 2′ alkanoyl erythromycin. The erythromycin compound is then reacted with a sulfonyl chloride having the formula $RSO_2Cl$ wherein R is a group as defined above. The reaction is best carried out in a suitable inert solvent such as pyridine. Preferably, the sulfonyl chloride is slowly added in dropwise fashion to a solution of the erythromycin. Also, it is usually desirable that some means such as an ice bath is employed to keep the temperature of the reaction mixture around about 0° C. The reaction mixture is then gently agitated until reaction is complete, usually ¼ to 1 hour.

If one starts with a 2′-O-alkanoyl erythromycin, and reacts it with the sulfonyl chloride, the product may, if desired, be de-esterified at the 2′-position through hydrolysis or alcoholysis. For example, this can be accomplished by adding the product to a solution of methanol and aqueous 5% $NaHCO_3$, and carrying out the reaction with agitation for about 24 hours. The methanol can then be removed under reduced pressure, and the product extracted with a suitable solvent such as chloroform.

The following examples more clearly illustrate the invention:

EXAMPLE I

2′-O-Acetyl-4″-O-Methanesulfonyl Erythromycin B

To a cold solution of 25.8 g. 2′-acetyl erythromycin B in 500 ml. of pyridine was slowly added dropwise 25 ml. of methanesulfonyl chloride. At the end of this addition, the reaction mixture was cooled for an additional 15 minutes, then removed from the ice bath and stirred at ambient temperature for one hour. The reaction mixture was then slowly poured into 2.5 liters of 5% $NaHCO_3$ solution and extracted with four 500 ml. portions of chloroform. The combined extracts were washed with two 500 ml. portions of cold water. The chloroform layer was then dried over magnesium sulfate. Later the drying agent was removed by filtration and the filtrate concentrated under reduced pressure. The residual pyridine was removed by azeotroping with benzene under reduced pressure. Recrystallization from acetone-water yielded 26.2 g. (90%) of 2'-O-acetyl-4"-O-methanesulfonyl erythromycin B.

The elementary analysis was in agreement with the empirical formula $C_{40}H_{71}NO_{15}S$. M.P. 212–214° (dec.).

Theory: C, 57.33; H, 8.54; N, 1.67; S, 3.84. Found: C, 57.08; H, 8.71; N, 1.45; S, 3.60.

EXAMPLE II

4"-O-Methanesulfonyl Erythromycin B

To a solution of 22.4 g. 2'-O-acetyl-4"-O-methanesulfonyl erythromycin B in 500 ml. of methanol was added 50 ml. of 5% $NaHCO_3$ solution in one portion. It was then stirred at room temperature for 24 hours and poured into 2 liters of cold water and extracted with two 500 ml. portion of chloroform. The extracts were combined and dried over magnesium sulfate. The extracts were then filtered to remove drying agent and the filtrate concentrated under reduced pressure. Recrystallization from acetone-water yielded 15.6 g. (88%) of 4"-O-methanesulfonyl erythromycin B. M.P. 135–138° (dec.).

The elementary analysis was in agreement with the empirical formula $C_{38}H_{69}NO_{14}S$.

Theory: C, 57.33; H, 8.74; N, 1.75; S, 4.03. Found: C, 57.33; H, 9.02; N, 1.54; S, 3.82.

EXAMPLE III

4"-O-Methanesulfonyl Erythromycin A

This compound is prepared by the process of Example I with the exception that erythromycin A was used as a reaction with the methanesulfonyl chloride.

The elementary analysis was in agreement with the empirical formula $C_{38}H_{69}NO_{15}S$.

EXAMPLE IV

4"-O-Vinylsulfonyl Erythromycin B

This compound was formed according to the procedure of Example I with the exception that the reactants were erythromycin B and 2-bromoethanesulfonyl chloride.

The elementary analysis was in agreement with the empirical formula $C_{39}H_{69}NO_{14}S$.

Theory. C, 57.97; H, 8.61; N, 1.73. Found: C, 57.85; H, 8.95; N, 1.66.

EXAMPLE V

4"-O-p-Nitrobenzenesulfonyl Erythromycin B

To a cooling solution of 3.59 g. (5.00 mM.) of erythromycin B dissolved in 50 ml. of pyridine, was added in one portion 3.33 g. (0.015 m.) of p-nitrobenzenesulfonyl chloride. After all of the sulfonyl chloride had dissolved (15 minutes), the reaction mixture was allowed to stand at room temperature for seven days. After this period of time, the reaction mixture was poured into 500 ml. of 5% $NaHCO_3$ solution. This mixture was extracted with 3×300 ml. protions of benzene. The extracts were combined and washed again with 500 ml. of 5% $NaHCO_3$ solution. The layers were separated and the organic layer was dried over $MgSO_4$, filtered and concentrated to leave 4.40 g. of product. This product was purified by column chromatography to obtain an analytically pure sample.

The elementary analysis was in agreement with the empirical formula $C_{43}H_{70}N_2O_{16}S_2$.

Theory: C, 57.19; H, 7.81; N, 3.10. Found: C, 56.93; H, 7.80; N, 2.99.

EXAMPLE VI

4"-O-Vinylsulfonyl Erythromycin A

This compound was made according to the procedure of Example I with the exception that erythromycin A and 2-bromoethanesulfonyl chloride were the reactants.

The elementary analysis was in agreement with the empirical formula $C_{39}H_{69}NO_{15}S$.

EXAMPLE VII

4"-O-Benzylsulfonyl Erythromycin B

This compound was prepared according to the procedure described in Example I. From 3.59 g. (5.00 mM.) of erythromycin B was obtained 4.29 g. of desired material. This material was purified by column chromatography to obtain an analytically pure sample. The analysis agreed with the desired product.

EXAMPLE VIII

4"-O-Benzylsulfonyl Erythromycin A

This compound was prepared by the same procedure as described in Example I. From 3.67 g. (5.00 mM.) of erythromycin A was obtained 4.45 g. of desired material. This material was purified by column chromatography to obtain an analytically pure sample. The analysis agreed with the desired product.

EXAMPLE IX

4"-O-β-Phenoxyethylsulfonyl Erythromycin B

This compound may be prepared according to the procedure of Example I with the exception that erythromycin B and β-phenoxyethylsulfonyl chloride are the reactants.

EXAMPLE X

4"-O-β-Phenoxyethylsulfonyl Erythromycin A

This compound may be prepared according to the procedure of Example I with the exception that erythromycin A and β-phenoxyethylsulfonyl chloride are the reactants.

EXAMPLE XI

4"-O-p-Nitro-β-Phenoxyethylsulfonyl Erythromycin B

This compound was prepared according to the procedure described in Example I with the exception that erythromycin B and para-nitro-β-phenoxyethylsulfonyl chloride are the reactants.

EXAMPLE XII

4"-O-p-Nitro-β-Phenoxyethylsulfonyl Erythromycin A

This compound was prepared according to the procedure described in Example I with the exception that erythromycin A and para-nitro-β-phenoxyethylsulfonyl chloride are the reactants.

Other erythromycin derivatives falling within the scope of the invention may be prepared by, for example, varying the particular sulfonyl chloride used by varying the R group in said sulfonyl chloride. Generally when R is alkyl it is a loweralkyl $C_{1-4}$ branched or straight chain. Likewise R may be any loweralkenyl group other than vinyl, generally $C_{1-4}$ branched or straight chain alkenyl. When R is substituted aryl the substituent on the benzene ring may be nitro, halo, alkyl, etc. The same substituents may be present when the benzyl sulfonates are substituted in the aromatic ring. Generally when R is a substituted aroxyalkyl radical, the substituent on the benzene ring may be nitro, halo, alkyl, etc. Likewise, instead of erythromycin A or B, erythromycin C may be substituted as a reactant. Lastly, when the erythromycin reactant has its 2' position substituted as alkanoyl, the $R_2$ group is usually a lower $C_{1-4}$ branched or straight chain alkanoyl.

Representative erythromycin derivatives here were tested for their antibiotic activity both *in vivo* and *in vitro*. To test the compounds *in vivo* mice were injected with *Staphylococcus aureus* Smith and various dosages of the antibiotic administered to treat the infection. All infected mice which were not treated died, whereas varying percentages of mice also treated with antibiotic survived as shown below.

The compounds were also tested *in vitro* against a variety of gram negative and gram positive bacteria. Figures given below are MIC values in terms of mcg./ml.

A wide variety of organisms were used to test the *in vitro* activity of the compounds here. These are as follows:

1. *Staphylococcus aureus* 9144
2. *Staphylococcus aureus* Smith
3. *Staphylococcus aureus* Smith ER
4. *Staphylococcus aureus* Quinones
5. *Staphylococcus aureus* Wise 155
6. *Streptococcus faecalis* 10541
7. *Escherichia coli* Juhl
8. *Klebsiella pneumoniae* 10031
9. *Proteus vulgaris* Abbott JJ
10. *Proteus mirabilis* Finland #9
11. *Salmonella typhimurium* Ed #9
12. *Shigella sonnei* 9290
13. *Pseudomonas aeruginosa* BMH #10
14. *Streptococcus pyogenes* Roper
15. *Streptococcus pyogenes* Scott
16. *Haemophilus influenzae* 9334
17. *Haemophilus influenzae* Brimm CSF
18. *Haemophilus influenzae* Illinois
19. *Haemophilus influenzae* Patterson
20. *Haemophilus influenzae* Shemwell
21. *Haemophilus influenzae* Terry
22. *Myco. gallisepticum* S6
23. *Myco. granularum* 19168
24. *Myco. hyorhinis* 17981
25. *Myco. pneumoniae* FH
26. *Trichomonas vaginalis* C1M1
27. *Crithidia fasciculata*
28. *Staphylococcus aureus* 209P ER
29. *Staphylococcus aureus* MIH #7
30. *Staphylococcus aureus* Wise J. 66
31. *Staphylococcus aureus* Wise J. 348
32. *Staphylococcus aureus* Wise J. 419
33. *Staphylococcus aureus* Wise J. 645
34. *Diplococcus pneumoniae* Dixon 23

Results of *in vivo* testing are as follows. All antibiotic compounds of the invention were administered orally.

TABLE I

| Dosage | Percent survival | | |
|---|---|---|---|
| | 300 mg./kg. | 150 mg./kg. | 75 mg./kg. |
| Example No.: | | | |
| I | 10 | | 10 |
| II | 100 | | 40 |
| III | 100 | 60 | 40 |
| V | 60 | 0 | 0 |

*In vitro* results are as follows:

TABLE II.—EXAMPLE I

| Organism No.: | MIC |
|---|---|
| 1 | 3.1 |
| 2 | 1.56 |
| 3 | >100 |
| 4 | 6.2 |
| 5 | 12.5 |
| 6 | .39 |
| 7 | >100 |
| 8 | 6.2 |
| 9 | >100 |
| 10 | >100 |
| 11 | 50 |
| 13 | >100 |
| 14 | >100 |
| 15 | >100 |
| 16 | 50 |
| 22 | .50 |
| 23 | 1.0 |
| 24 | 100 |
| 25 | .25 |
| 26 | >100 |
| 27 | >100 |
| 4 | 12.5 |
| 5 | 50 |
| 2 | .78 |

TABLE III.—EXAMPLE II

| Organism No.: | MIC |
|---|---|
| 1 | 3.1 |
| 2 | 3.1 |
| 3 | >100 |
| 4 | 12.5 |
| 5 | 12.5 |
| 6 | 12.5 |
| 7 | >100 |
| 8 | 3.1 |
| 9 | >100 |
| 10 | >100 |
| 11 | 100 |
| 13 | >100 |
| 14 | >100 |
| 15 | >100 |
| 16 | 2.5 |
| 22 | .25 |
| 23 | .50 |
| 24 | 25 |
| 25 | .25 |
| 26 | >100 |
| 27 | >100 |
| 4 | 12.5 |
| 5 | 25 |
| 2 | 89 |

TABLE IV.—EXAMPLE III

| Organism No.: | MIC |
|---|---|
| 1 | .39 |
| 2 | .39 |
| 3 | >100 |
| 4 | 3.1 |
| 5 | 6.2 |
| 6 | .20 |
| 7 | >100 |
| 8 | 6.2 |
| 9 | >100 |
| 10 | >100 |
| 11 | 100 |
| 12 | 100 |
| 13 | >100 |
| 14 | >100 |
| 15 | >100 |
| 16 | 12.5 |
| 17 | 6.2 |
| 18 | 12.5 |
| 19 | 12.5 |
| 20 | 25 |
| 21 | 12.5 |
| 22 | .25 |
| 23 | 1.0 |
| 24 | 50 |
| 25 | .05 |
| 26 | >100 |
| 27 | >100 |
| 28 | 3.1 |
| 3 | 3.1 |
| 29 | 3.1 |
| 30 | 6.2 |
| 31 | 6.2 |
| 32 | 6.2 |
| 33 | 6.2 |
| 34 | 100 |

TABLE V.—EXAMPLE V

| Organism: | MIC |
|---|---|
| 22 | .05 |
| 23 | 25 |
| 24 | 100 |
| 25 | .10 |
| 26 | >100 |
| 27 | >100 |
| 4 | 50 |
| 5 | >100 |
| 2 | .78 |

The compounds of the invention here are useful as antibiotics when administered to warm-blooded animals at a preferred dosage of 25–2000 mg./kg. of body weight daily to treat infections in which one of the above or another susceptible bacterial organisms is the causative agent. More often the dosage is 75–1000 mg./kg.

Although administration is possible by the intraperitoneal route wherein the dose is dissolved or suspended in an inert physiologically harmless agent such as aqueous tragacanth, the preferred route is oral, either in capsule or tablet form. Capsules can, in addition to the active erythromycin also contain inert fillers such as lactose.

Tablets are made in the usual manner on tableting presses, and although the active compounds may be tableted alone, it is preferred that a release agent such as magnesium stearate to aid in freeing the tablets from the machine dies during manufacture, together with a binder such as starch to assure good particle cohesion are included in a blend of active ingredient and diluents prior to tableting. After tableting, the tablets can be coated if desired. A preferred blend for tableting is as follows:

|  | Percent |
|---|---|
| Erythromycin compound | 77 |
| Magnesium stearate | 2 |
| Starch powder | 21 |

We claim:

1. A sulfonyl derivative of erythromycin falling within the following structural formula:

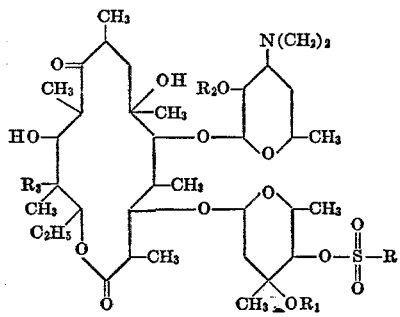

where R is selected from the group consisting of $C_{1-4}$ loweralkyl, $C_{1-4}$ loweralkenyl, monocyclic aryl, substituted nitro, halo, alkyl aryl, benzyl, substituted nitro, halo, alkyl benzyl, aroxyalkyl and substituted nitro, halo, and alkyl aroxyalkyl; $R_1$ is hydrogen or methyl, $R_2$ is hydrogen or $C_{1-4}$ loweralkanoyl, and $R_3$ is hydrogen or hydroxyl.

2. The erythromycin derivative of Claim 1 wherein R is methyl, $R_1$ is methyl, $R_2$ is acetyl, and $R_3$ is hydrogen.

3. The erythromycin derivative of Claim 1 wherein R is methyl, $R_1$ is methyl, $R_2$ is hydrogen and $R_3$ is hydrogen.

4. The erythromycin derivative of Claim 1 wherein R is methyl, $R_1$ is methyl, $R_2$ is hydrogen, and $R_3$ is hydroxyl.

5. The erythromycin derivative of Claim 1 wherein R is vinyl, $R_1$ is methyl, $R_2$ is hydrogen, and $R_3$ is hydrogen.

6. The erythromycin derivative of Claim 1 wherein R is vinyl, $R_1$ is methyl, $R_2$ is hydrogen, and $R_3$ is hydroxyl.

7. The erythromycin derivative of Claim 1 wherein R is para-nitrobenzene, $R_1$ is methyl, $R_2$ is hydrogen, and $R_3$ is hydrogen.

References Cited

UNITED STATES PATENTS 3,736,313    5/1969    Jones et al. _____ 260—210 E

JOHNNIE R. BROWN, Primary Examiner

C. B. OWENS, Assistant Examiner

U.S. Cl. X.R.

424—181

UNITED STATES PATENT OFFICE
CERTIFICATE OF CORRECTION

Patent No. 3,836,519          Dated September 17, 1974

Inventor(s) Robert Hallas, Jerry Roy Martin, John Soloman Tadanier

It is certified that error appears in the above-identified patent and that said Letters Patent are hereby corrected as shown below:

In Column 6, Table III, under MIC, line 26, delete the number "89" and substitute therefor --.39--;

In Column 7, Claim 1, delete the formula:

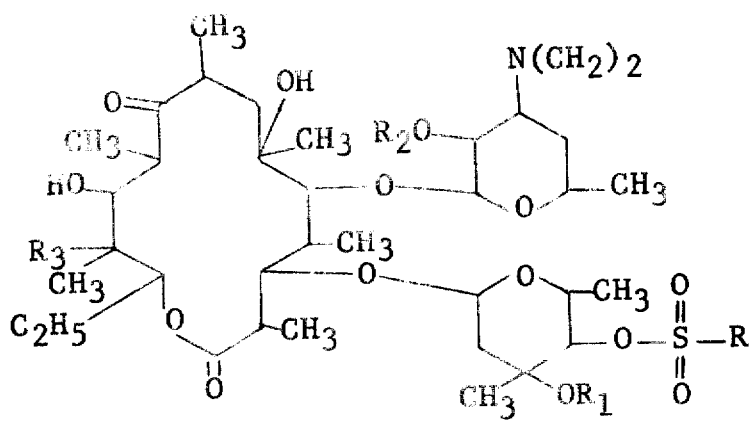

and substitute therefor:

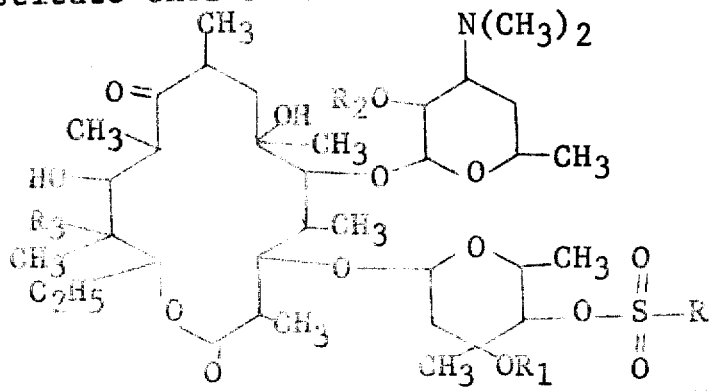

Signed and sealed this 26th day of November 1974.

(SEAL)
Attest:

McCOY M. GIBSON JR.
Attesting Officer

C. MARSHALL DANN
Commissioner of Patents